(12) United States Patent
Rozenboim

(10) Patent No.: US 11,463,276 B2
(45) Date of Patent: Oct. 4, 2022

(54) SYSTEM AND METHOD FOR PROVIDING A MULTI-DIMENSIONAL RING-LATTICE NETWORK TOPOLOGY

(71) Applicant: ORACLE INTERNATIONAL CORPORATION, Redwood Shores, CA (US)

(72) Inventor: Leonid Rozenboim, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/035,491

(22) Filed: Sep. 28, 2020

(65) Prior Publication Data

US 2021/0160097 A1    May 27, 2021

Related U.S. Application Data

(63) Continuation-in-part of application No. 16/868,368, filed on May 6, 2020.
(Continued)

(51) Int. Cl.
*H04L 12/42* (2006.01)
*H04L 12/46* (2006.01)
(Continued)

(52) U.S. Cl.
CPC ............. *H04L 12/42* (2013.01); *H04L 12/18* (2013.01); *H04L 12/4633* (2013.01); *H04L 12/4641* (2013.01); *H04L 67/568* (2022.05)

(58) Field of Classification Search
CPC ... H04L 12/42; H04L 2012/421; H04L 12/18; H04L 12/4633; H04L 12/4637; H04L 12/4641; H04L 67/2842
See application file for complete search history.

(56) References Cited

U.S. PATENT DOCUMENTS 5,267,238 A    11/1993  Yano et al.
6,628,624 B1    9/2003  Mahajan
(Continued)

OTHER PUBLICATIONS

Cisco, "High-Availability Seamless Redundancy in the Factory Network Design Guide", Sep. 1, 2020, retrieved from https://www.cisco.com/c/en/us/td/docs/solutions/Verticals/Machines/HSR/ConnMach-HSR/ConnMach-HSR.html, 22 pages.
(Continued)

*Primary Examiner* — Min Jung
(74) *Attorney, Agent, or Firm* — Tucker Ellis LLP

(57) ABSTRACT

Described herein are systems and methods providing a multi-dimensional ring-lattice network topology. Systems and methods disclosed herein provide for constructing network topologies in a form of a partial mesh (a partially connected network), where a bridge is capable of forwarding packets through other bridges when a direct link to the destination compute device is not available. A temporary on-demand tunnel is created by virtual networking software on-demand, to facilitate a direct tunnel between two virtual network interfaces where such a direct connection is not available with a permanent tunnel, and where there is sufficient traffic demand between these two interfaces that justifies a direct tunnel. The described approach provides a framework for achieving a compromise between link count limitation, and packet-forwarding path length, that can be tailored to address particular network requirements, together with a way to reliably predict the performance of the resulting network.

12 Claims, 11 Drawing Sheets

Related U.S. Application Data

(60) Provisional application No. 62/938,798, filed on Nov. 21, 2019.

(51) Int. Cl.
  *H04L 12/18* (2006.01)
  *H04L 67/568* (2022.01)

(56) References Cited

U.S. PATENT DOCUMENTS

| | | |
|---|---|---|
| 6,704,318 B1 | 3/2004 | Stuart |
| 6,775,295 B1 | 8/2004 | Lothberg et al. |
| 7,050,398 B1 | 5/2006 | Lee |
| 7,185,107 B1 | 2/2007 | Cassar |
| 9,794,169 B2 | 10/2017 | Tie et al. |
| 10,505,845 B2 | 12/2019 | Jetcheva |
| 2003/0048797 A1* | 3/2003 | Sandstrom ............ H04L 47/12 370/402 |
| 2006/0133286 A1 | 6/2006 | Elie-Dit-Cosaque |
| 2009/0073989 A1 | 3/2009 | Cai |
| 2011/0051644 A1* | 3/2011 | Huang ............... H04W 40/248 370/311 |
| 2015/0381418 A1* | 12/2015 | Fausak ................ H04L 41/046 709/221 |
| 2018/0026872 A1 | 1/2018 | Manthiramoorthy |
| 2018/0109654 A1 | 4/2018 | Rachlin |
| 2018/0131691 A1* | 5/2018 | Sundaram P ......... H04L 67/141 |

OTHER PUBLICATIONS

United States Patent and Trademark Office, Office Communication dated Nov. 15, 2021 for U.S. Patent Application No. 16868368, 9 pages.

* cited by examiner

SYSTEM AND METHOD FOR PROVIDING A MULTI-DIMENSIONAL RING-LATTICE NETWORK TOPOLOGY

CLAIM OF PRIORITY AND CROSS REFERENCE TO RELATED APPLICATIONS

This application is a continuation-in-part of, and claims the benefit of priority to, U.S. patent application titled "SYSTEM AND METHOD FOR PREVENTING SWITCH LOOPS IN LAYER-2 NETWORKS", application Ser. No. 16/868,368, filed on May 6, 2020, which application claims the benefit of priority to U.S. Provisional patent application titled "SYSTEM AND METHOD FOR PREVENTING SWITCH LOOPS IN LAYER-2 NETWORKS", Application No. 62/938,798, filed on Nov. 21, 2019; this application also claims the benefit of priority to U.S. Provisional patent application titled "SYSTEM AND METHOD FOR PREVENTING SWITCH LOOPS IN LAYER-2 NETWORKS", Application No. 62/938,798, filed on Nov. 21, 2019, each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer networks, and computer networking, and are particularly related to systems and methods for providing a multi-dimensional ring-lattice network topology.

BACKGROUND

A computer network provides connectivity, via links, among a set of nodes. The set of nodes are connected by a set of links (physical or virtual). The nodes may be local to and/or remote from each other. The nodes are connected by one or more links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Each node performs one or more functions, such as but not limited to routing data, filtering data, inspecting data, processing data, and/or storing data. Each node may be implemented by a function-specific hardware device and/or a generic machine.

Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

An IEEE Standard for Local and metropolitan area networks: Media Access Control (MAC) Bridges (IEEE 801.1D) provides a definition for technologies directed to, e.g., network bridging, and Spanning Tree Protocol (STP). However, Ethernet transparent bridges as defined in IEEE 802.1D generally do not cope well with redundancies in the network topology. Such redundancy create so called "switch loops", where packets traverse the same set of bridges endlessly, eventually overloading the network, and preventing it from carrying customer traffic.

A family of protocols implementing the Spanning Tree algorithm (STP, RSTP, MSTP) have been defined to cope with such loops by means of (1) detecting loops with the use of STP-specific packets (BPDUs), and (2) disabling packet forwarding on some of the ports, thereby eliminating loops, as well as the redundant paths. Virtual networks typically employ a fully connected mesh topology, where a packet is sent directly between two virtual network elements. This approach exhibits a quadratic ratio of cost vs. scale, i.e. the number of virtual tunnel end-points grows approximately with the square of the number of virtual network elements, or O(n*n) where "n" is the number of virtual network interfaces in a virtual network.

SUMMARY

Described herein are systems and methods providing a multi-dimensional ring-lattice network topology. Systems and methods disclosed herein provide for constructing network topologies in a form of a partial mesh (a partially connected network), where a bridge is capable of forwarding packets through other bridges when a direct link to the destination compute device is not available. A temporary on-demand tunnel is created by virtual networking software on-demand, to facilitate a direct tunnel between two virtual network interfaces where such a direct connection is not available with a permanent tunnel, and where there is sufficient traffic demand between these two interfaces that justifies a direct tunnel. The described approach provides a framework for achieving a compromise between link count limitation, and packet-forwarding path length, that can be tailored to address particular network requirements, together with a way to reliably predict the performance of the resulting network.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

In accordance with an embodiment, a computer network is implemented in accordance with a virtual topology that is instantiated on a physical topology. A physical topology can comprise a particular arrangement of digital devices, such as function-specific hardware devices and/or generic machines. In accordance with an embodiment, a virtual topology is a particular arrangement of virtual topology entities (VTEs). Each VTE is associated with one or more functions. Examples of functions include data routing, data filtering, data inspection, data storage, and/or any other type of data processing function.

In accordance with an embodiment, a virtual topology can be instantiated on a physical topology based on a virtual topology specification. During instantiation, VTEs of a virtual topology specification are mapped to digital devices of a physical topology. A VTE may correspond to a digital device itself, or a virtual component executing on the digital device. A single VTE may be mapped to multiple digital devices. Conversely, multiple VTEs may be mapped to a single digital device. A particular digital device mapped to a particular VTE implements the functions corresponding to the particular VTE. The virtual topology specification may, but does not necessarily, include any reference to a physical topology or digital devices therein. The virtual topology specification may, but does not necessarily, specify which digital devices of the physical topology perform which functions of which VTEs.

In accordance with an embodiment, multiple computer networks, implemented in accordance with respective virtual topologies, may be instantiated on a single physical topology. As an example, multiple tenants may share a set of digital devices, which are arranged according to a physical topology. Each tenant may have a different desired arrangement of VTEs. Each arrangement of VTEs corresponds to a different virtual topology. Each virtual topology, of the respective tenants, may be instantiated on the physical topology.

Figure 1:
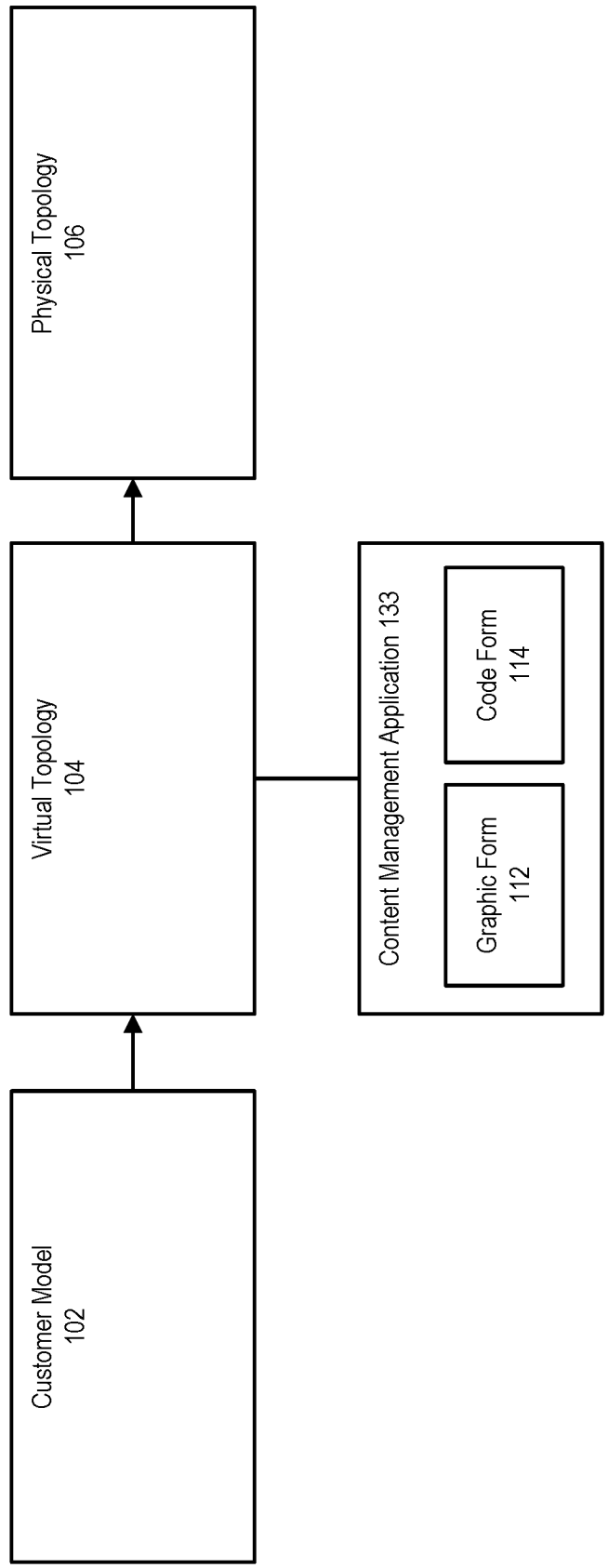
FIG. 1 illustrates relationships between a customer model, a virtual topology, and a physical topology, in accordance with an embodiment.

FIG. 1 illustrates relationships between a customer model 102, a virtual topology 104, and a physical topology 106, in accordance with an embodiment.

In accordance with an embodiment, physical topology 106 includes a particular arrangement of digital devices of a computer network. Digital devices include function-specific hardware devices and/or generic machines. An example of physical topology 106 is discussed below with reference to FIG. 3.

In accordance with an embodiment, the term "digital device" generally refers to any hardware device that includes a processor. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, a function-specific hardware device, a mainframe, a television, a content receiver, a set-top box, a printer, a mobile handset, a smartphone, and a personal digital assistant (PDA).

In accordance with an embodiment, the digital devices of a physical topology 106 form a computer network that provides connectivity between clients and network resources. Network resources include hardware and/or software configured to execute server processes. Examples of network resources include a processor, a data storage, a virtual machine, a container, and/or a software application. Network resources are shared amongst multiple clients. Such a computer network may be referred to as a "cloud network."

In accordance with an embodiment, additionally, the digital devices of a physical topology 106 form a computer network that is shared amongst multiple tenants. Different tenants may demand different network requirements for the computer network. Examples of network requirements can include processing speed, amount of data storage, security requirements, performance requirements, throughput requirements, latency requirements, resiliency requirements, Quality of Service (QoS), emulating performance of functions by VTEs, time to live (TTL) value of the data, and/or tenant isolation.

In accordance with an embodiment, a customer model 102 includes a particular arrangement of components of a computer network that is requested by a customer. The computer network may be an on-premise network of the customer and/or a private network of the customer. A customer model 102 may correspond to a computer network that is implemented by the customer and/or a customer's design of a computer network. A customer may request a particular customer model 102 in order to satisfy network requirements as well as security, performance, behavioral, and/or resiliency goals.

In accordance with an embodiment, a customer model 102 may include an arrangement of digital devices that is unnecessarily duplicative and/or inefficient. The efficiencies may be a result of the constraints imposed by the physical nature of customer model 102. As an example, a physical design may include specification of each redundant paired component and corresponding interconnections. The physical design may specify that the redundant paired components are horizontally scaled according to a particular heuristic. The physical design may include specification of each scaled element and corresponding interconnections. The specification of redundant elements may give rise to inefficiencies.

In accordance with an embodiment, a customer may request implementation of a customer model 102 on a multi-tenant computer network. Implementation of the customer model 102 may include migrating a computer network already implemented by the customer onto the multi-tenant computer network. However, the customer model 102 may have no relationship to the physical topology 106 of the multi-tenant computer network. The customer model 102 and the physical topology 106 of the multi-tenant computer network may include different components and/or a different arrangement of the components. A customer model 102 may be used to determine a virtual topology specification 105, which is used to instantiate with a virtual topology 104 on a physical topology 106.

In accordance with an embodiment, a virtual topology 104 includes a particular arrangement of virtual topology entities (VTEs). Each VTE is associated with one or more functions. The function may be implemented in order to satisfy network requirements and/or improve security, resiliency, and/or performance levels. Examples of functions performed by VTEs include but are not limited to the ability to: (a) routing and/or forwarding data to a next hop; (b) filtering and/or rejecting data based on a criterion; (c) inspecting data for security issues and/or other issues; (d) hiding and/or modifying a source address and/or destination address of data; (e) distributing data to resources based on availability of resources; (f) compressing data; (g) caching data; (h) storing data; and (i) processing data.

In accordance with an embodiment, a VTE associated with a particular function may operate as a particular type of virtual component and/or physical component. Examples of VTEs include but are not limited to a gateway, a router, a switch, a hub, a proxy, a firewall, an intrusion detection system (IDS), a network address translator (NAT), a load balancer, and a network optimizer.

In accordance with an embodiment, virtual topology specification 105 is a description of a virtual topology 104. A virtual topology specification 105 describes the functions of each VTE in a virtual topology 104. A virtual topology specification 105 may but does not necessarily include any reference to a physical topology 106 and/or digital devices therein. A virtual topology specification 105 may but does not necessarily specify which digital devices of a physical topology 106 perform which functions of which VTEs. The description of the particular arrangement of VTEs may be provided in various forms, such as graphic form 112 and/or code form 114. A graphic form 112 of a virtual topology specification 105 may include a graph of the VTEs, such as the graph illustrated in FIG. 2. A graphic form 112 may be specified by user input via a user interface. As an example, a user interface may include drag-and-drop functionality. A user may drag-and-drop a particular VTE to a particular location of a graph presented on the user interface. The user may connect the particular VTE to other VTEs already shown on the graph. The user may configure each VTE through the user interface. Based on the user input, the particular arrangement of the VTE in relation to the other VTEs already shown on the graph is specified.

In accordance with an embodiment, a code form 114 of a virtual topology specification 105 may include lines of code, commands, or other textual descriptions of the particular arrangement of VTEs. As an example, a particular line of code may specify a name and/or function of a particular VTE. Another line of code may specify a particular arrangement of various VTEs. Code form 114 may be expressed in any computing language, such as XML (Extensible Markup Language), JSON (JavaScript Object Notation), Y AML, Java, C++, C, C#, and Python.

In accordance with an embodiment, a virtual topology specification 105 includes a description of one or more forwarding policies. A forwarding policy specifies reachability between VTEs. The forwarding policy determines a next hop for a data packet based upon a destination prefix of the data packet and/or other metadata. Other metadata may include a port from which the data packet was received, or a hash value of a particular field of the data packet. The forwarding policy may be applied to Layer 3 transport protocols and/or Layer 2 transport protocols.

In accordance with an embodiment, a virtual topology 104 may be instantiated on physical topology 106. During instantiation, VTEs of the virtual topology are mapped to digital devices of the physical topologies. A single VTE may be mapped to multiple digital devices. Conversely, multiple VTEs may be mapped to a single digital device. A particular digital device mapped to a particular VTE implements the functions corresponding to the particular VTE.

Figure 2:
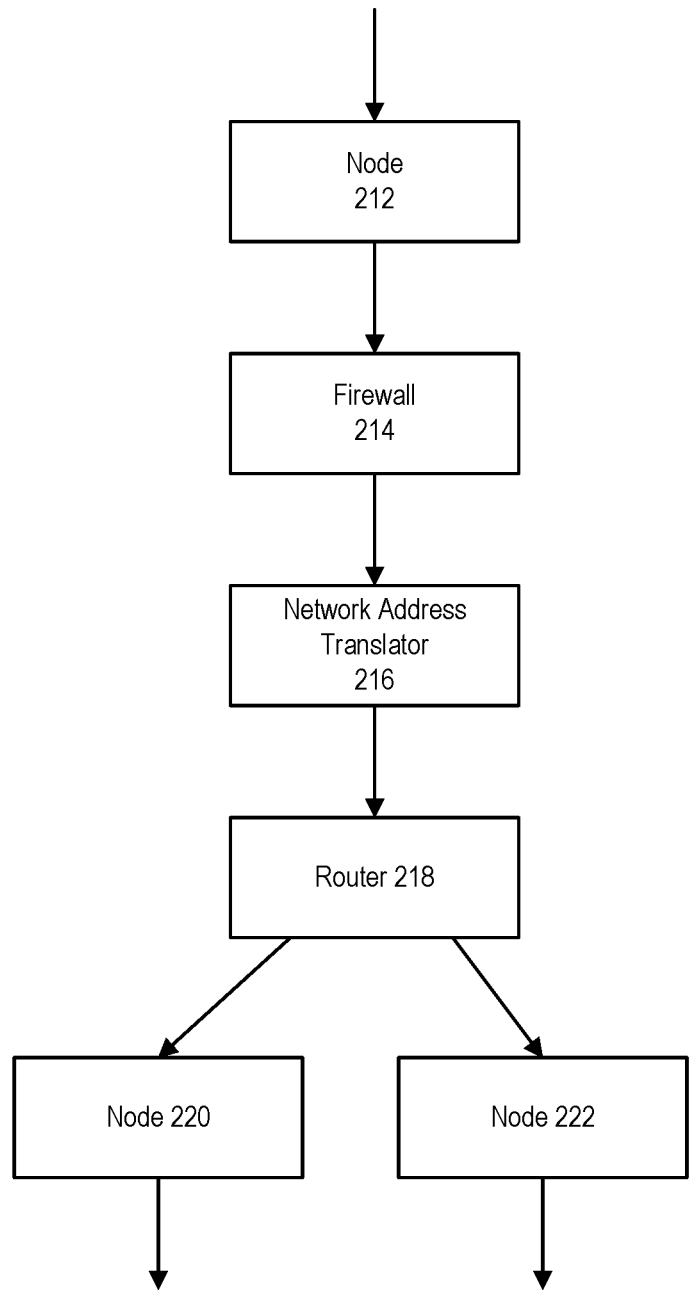
FIG. 2 illustrates an example of a virtual topology specification, in accordance with an embodiment.

In accordance with an embodiment, multiple virtual topologies 104 may be instantiated by a single physical topology 106. As an example, multiple tenants may share a set of digital devices corresponding to a physical topology. Meanwhile, each tenant may desire a different arrangement of VTEs for implementing a computer network that satisfies the tenant's particular network requirements. A different virtual topology may be required for each tenant. The same set of digital devices may be used to instantiate the multiple different virtual topologies FIG. 2 illustrates an example of a virtual topology specification, in accordance with an embodiment.

In accordance with an embodiment, a virtual topology specification 200 includes various VTEs, including node 212, firewall 214, network address translator (NAT) 216, router 218, node 220, and node 222. Virtual topology specification 200 may include more or fewer VTEs than the VTEs illustrated in FIG. 2. Each VTE is represented as a box. A connection between the VTEs is represented by a line.

In accordance with an embodiment, virtual topology specification 200 may be generated by a user submitting user input via a user interface. As an example, the user may be a representative of a customer (e.g., company with data being stored/processed by a cloud network), or a representative of a third party company implementing the computer network. The user may drag and-drop a VTE to a particular location on a graph presented by the user interface. The user may label the VTE as "node 212." The user may drop-and-drop another VTE to another location on the graph. The user may label the VTE as "firewall 214." The user may add a line connecting node 212 and firewall 214. The user may further specify the functions performed by node 212 and firewall 214.

In accordance with an embodiment, an example virtual topology specification 200 specifies how data is supposed to traverse through the VTEs. Data is supposed to traverse through the VTEs according to the connections linking the VTEs. As illustrated, for example, data may be transmitted from node 212 to node 220 by traversing through firewall 214, NAT 216, and router 218. At firewall 214, the data may be processed to perform a firewall functionality associated with firewall 214. Based on the firewall functionality, the data may be inspected to determine whether to allow the data to pass through. Additionally, at NAT 216, the data may be processed to perform a NAT functionality associated with NAT 216. Based on the NAT functionality, the source address and/or destination address of the data may be modified. Additionally, at router 218, the data may be processed to perform the routing functionality of router 218. Based on the routing functionality, the next hop of the data may be identified as node 220. Router 218 may forward the data to node 220.

Figure 3:
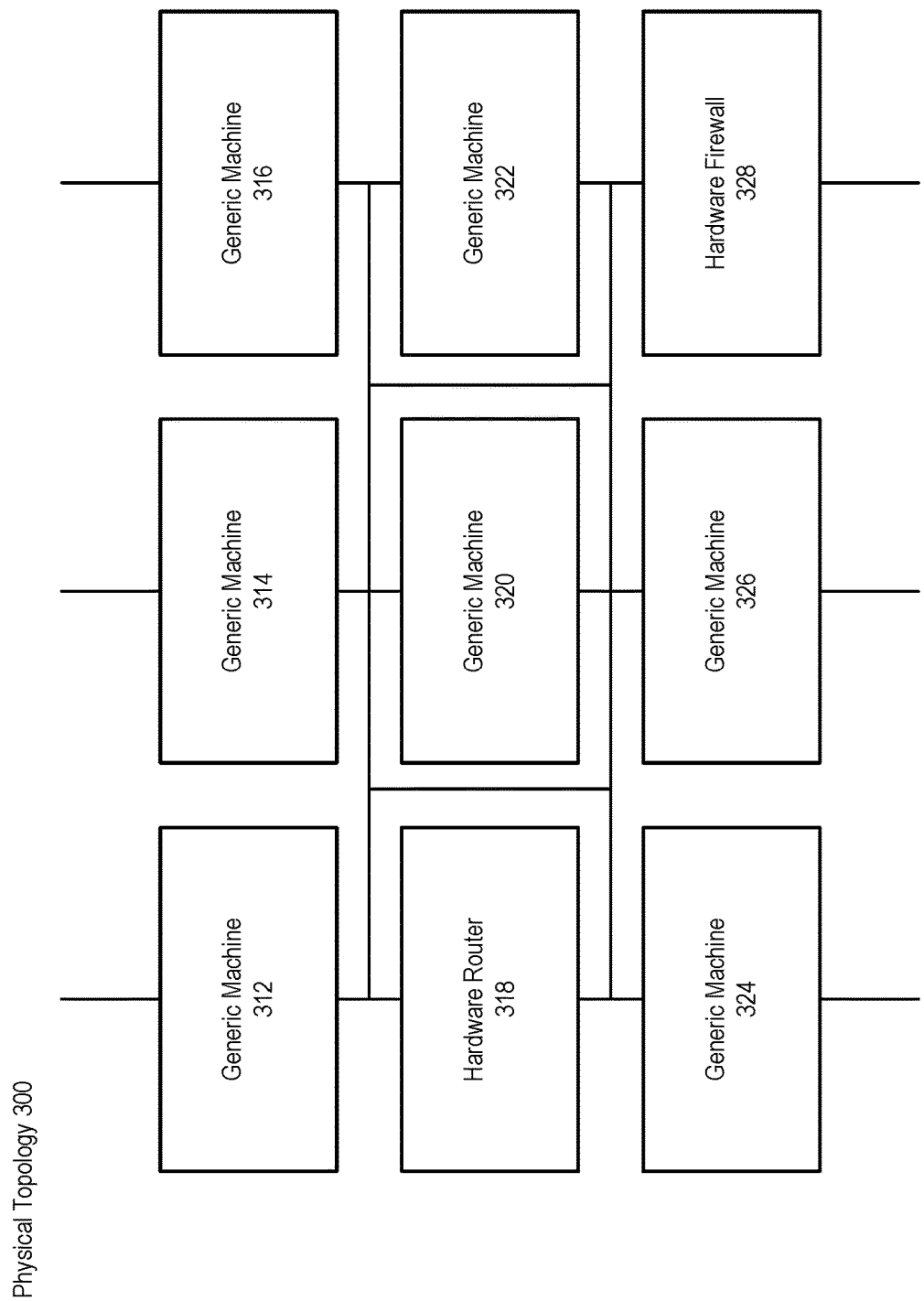
FIG. 3 illustrates an example of a physical topology, in accordance with an embodiment.

FIG. 3 illustrates an example of a physical topology, in accordance with an embodiment.

In accordance with an embodiment, physical topology 300 includes various digital devices, including generic machines 312-316 and 320-326, hardware router 318, and hardware firewall 328. Physical topology 300 may include more or fewer digital devices than the digital devices illustrated in FIG. 3. Each digital device is represented as a box. Each digital device may be connected to any number of one or more other digital devices within physical topology 300. The digital devices may be located in a single geographical location or distributed across various geographical locations.

In accordance with an embodiment, physical topology 300 may correspond to a cloud network. The digital devices shown in physical topology 300 may be shared amongst multiple client devices and/or tenants. A particular digital device may perform a same function for different client devices and/or tenants. A particular digital device may perform different functions for different client devices and/or tenants.

In accordance with an embodiment, there are multiple ways to instantiate a virtual topology, described by a same virtual topology specification, on a physical topology. Instantiation of a virtual topology on a physical topology 300 includes mapping VTEs described in a virtual topology specification to digital devices of the physical topology 300.

In accordance with an embodiment, VTEs in a virtual topology may be executed in an overlay network. The overlay network is implemented on top of an underlay network corresponding to the physical topology. Each VTE is associated with two addresses: (a) an overlay address corresponding to the VTE and (b) an underlay address corresponding to the digital device on which the VTE is instantiated. The addresses may be fixed (for example, entered by a network administrator). Additionally, or alternatively, the addresses may be dynamically assigned (for example, by a Dynamic Host Configuration Protocol (DHCP) and/or another application). Data is transmitted between VTEs in a virtual topology by tunneling through the underlying network.

Multi-Dimensional Ring-Lattice Network

In accordance with an embodiment, the disclosed systems and methods for supporting a multi-dimensional ring-lattice network can be provided in regards to network topologies, and provides a system and method for building partial mesh topologies which improves and/or optimizes both distance and link count. The systems and method disclosed applies to physical network topologies as well as virtual network topologies, offering each distinct advantage.

In accordance with an embodiment, as described above, a network comprises nodes connected by a number of links. A node can comprise, e.g., a compute device or a bridge device. Bridge devices are typically the network elements that along with links create the network, while compute devices are the elements that consume network services. When a network is presented in the form of a graph, the compute devices comprise graph leaves, while bridges comprise non-leaf nodes, and links comprise the graph arcs. Bridge nodes may connect to multiple compute nodes and multiple bridges, up to the maximum number of links supported by a given bridge device and based on other aspects of an exemplary topology.

In accordance with an embodiment, a network topology is considered a full mesh when all bridge devices are directly connected to all other bridge devices in the same networking domain. In a full mesh network, a packet may traverse up to two bridge devices when traversing between any two compute devices (e.g., compute nodes and/or consumer nodes).

In accordance with an embodiment, a full mesh topology has the advantage of always having packets traverse the shortest, optimal path, but has a higher cost due to the number of links each bridge needs to support, which has a quadratic relation to the total node count. More accurately, the number of links (NumLinks) can be defined by the number of nodes (NumNodes) by the following:

$$NumLinks = \frac{NumNodes * (NumNodes - 1)}{2}$$

In accordance with an embodiment, because the number of links is related quadratically to the number of nodes, with physical topologies, scaling can be problematic. Within physical networks, the limit on the link count on each bridge is evident and obvious. In virtual networks, these "links" are tunnels which comprise two tunnel end-points, which are represented as network element addresses stored in memory. Since memory too is a finite resource, the quadradic relation of memory size to the virtual node count also becomes a problem when scaling virtual networks.

In accordance with an embodiment, the systems and methods disclosed herein provide for constructing network topologies in a form of a partial mesh (a partially-connected network), where a bridge is capable of forwarding packets through other bridges when a direct link to the destination compute device is not available. A temporary on-demand tunnel is created by virtual networking software on-demand, to facilitate a direct tunnel between two virtual network interfaces where such a direct connection is not available with a permanent tunnel, and where there is high enough or sufficient traffic demand between these two interfaces that justifies a direct tunnel. The systems and methods disclosed provide a framework for achieving a compromise between link count limitation and packet forwarding path length that can be tailored to a given problem, and a way to reliably predict the performance of the resulting network.

In accordance with an embodiment, the below simplified example is discussed in the context of city planning, which can be thought of in an analogous manner.

For example, suppose a small town consists of N single-story houses, which are all built along a single, main road. This is analogous to a one-dimensional lattice. A person traveling between the houses can traverse a single dimension, the main road, in one of two directions. Each node will have two links (to its closest neighbors), and in the worst case, in order for the person travel between the furthest two houses, the person will need to pass by (N−1) houses.

In accordance with an embodiment, next suppose a town which comprises a straight-angle grid (e.g., streets and avenues), where for simplicity there is one single-story building in each street block. This is analogous to a two-dimensional lattice, where each node consists of 4 links that connect to its nearest neighbors. With N blocks (and thus houses) in each direction, the total number of houses is $N^2$ and the time to move between any two buildings is about (N−1)×2 in the worst case.

In accordance with an embodiment, next suppose that a city is similar to a town where each building has N stories.

For simplicity, let each floor consist of a single apartment. Now there are $N^3$ apartments in the city, and the worst-case distance between any two apartments is only $(N-1)+(N-1)+(2\times N)=(4\times N)-2$, and that is because the links to neighboring buildings is only found on the ground floor. If it was possible to move to a neighboring building from any floor without moving vertically, the number of links for every node (e.g., apartment in this analogy) will be 6, and the maximum distance will be $(N-1)\times 3$.

In accordance with an embodiment, the simplified example above cannot progress beyond this point. However, a network topology design is not limited in the same way. With the addition of more dimensions, the difference in the rate of increase of the travel distance, versus the increase in node count, improves with every dimension added. In such an example, the addition of a number of dimensions beyond three can be advantageous.

In accordance with an embodiment, another direction of improvement not easily transferrable to the real world is where edge nodes are connected with un-used links. In the single-dimension case, the simple string of N nodes connected with each other using two links per node becomes a ring, where the nodes are all connected to two nodes, and the travel distance decreases from $(N-1)$ to $N/2$ approximately.

In accordance with an embodiment, similarly, a two-dimensional lattice with N nodes can have its edge nodes connected to those on the corresponding opposite edge, in that the lattice now is formed from rings rather than strings. The number of links used by each node is 4, and the worst-case travel distance (in terms of links traversed) similarly decreases henceforth to approximately:

$$C = \frac{\sqrt[2]{N}}{2} * 2$$

In accordance with an embodiment, with a three-dimensional lattice with N nodes, the number of links from each node is 6, and the worst-case distance in terms of links traversed becomes approximately:

$$C = \frac{\sqrt[3]{N}}{2} * 3$$

In accordance with an embodiment, with a four-dimensional lattice with N nodes, the number of links from each node is 8, and the worst-case travel distance becomes approximately:

$$C = \frac{\sqrt[4]{N}}{2} * 4$$

In accordance with an embodiment, the above formulae are for approximate travel distances, and assume that N is an even number, and is a power of the dimension (e.g., $N=(k*2)^4$) in the last example for some k. Otherwise the result of the root would need to be rounded up to the next integer.

In accordance with an embodiment, the above approximations are well-suited for approximating how the packet forwarding distance changes with network scale, and how the number of links, which is twice the dimension size, affect it too. A generalized formula for C, the distance between the farthest two nodes within a lattice of N nodes and a dimension level dim, as well as the number of links L per node, can be illustrated:

$$C = \left\lfloor \frac{\lceil \sqrt[dim]{N} \rceil}{2} \right\rfloor * \dim$$

$$L = 2 * \dim$$

In accordance with an embodiment, in the above formula for C, it is noted that the dimensional root of N is to be rounded to the nearest higher integer, while the quotient is rounded to the nearest lower integer.

In accordance with an embodiment, the above formulae provide approximations that effectively show the worst-case distance dependence on the total node count, and also assumes all dimensions are equal in size.

In accordance with an embodiment, the formula illustrated below makes fewer assumptions about dimension size symmetry, but assumes that all rings in a given dimension are of the same size:

$$N = N_1 * N_2 * \ldots * N_{dim}$$

$$C = \left\lfloor \frac{N_1}{2} \right\rfloor + \left\lfloor \frac{N_2}{2} \right\rfloor + \ldots + \left\lfloor \frac{N_{dim}}{2} \right\rfloor$$

In accordance with an embodiment, Table 1 compares the approximate complexity of a traditional full mesh with the methodology of certain partially-connected mesh networks with respect to link count (cost) and worst-case distance (performance):

TABLE 1

| N = total node count<br>dim = dimension level | Fully Connected Mesh | Multi-Dimension<br>Ring-Lattice |
|---|---|---|
| Link Count | $O(N^2)$ | $O(\dim)$ |
| Worst Case Distance | $O(1)$ | $O(\sqrt[dim]{N})$ |

Figure 4:
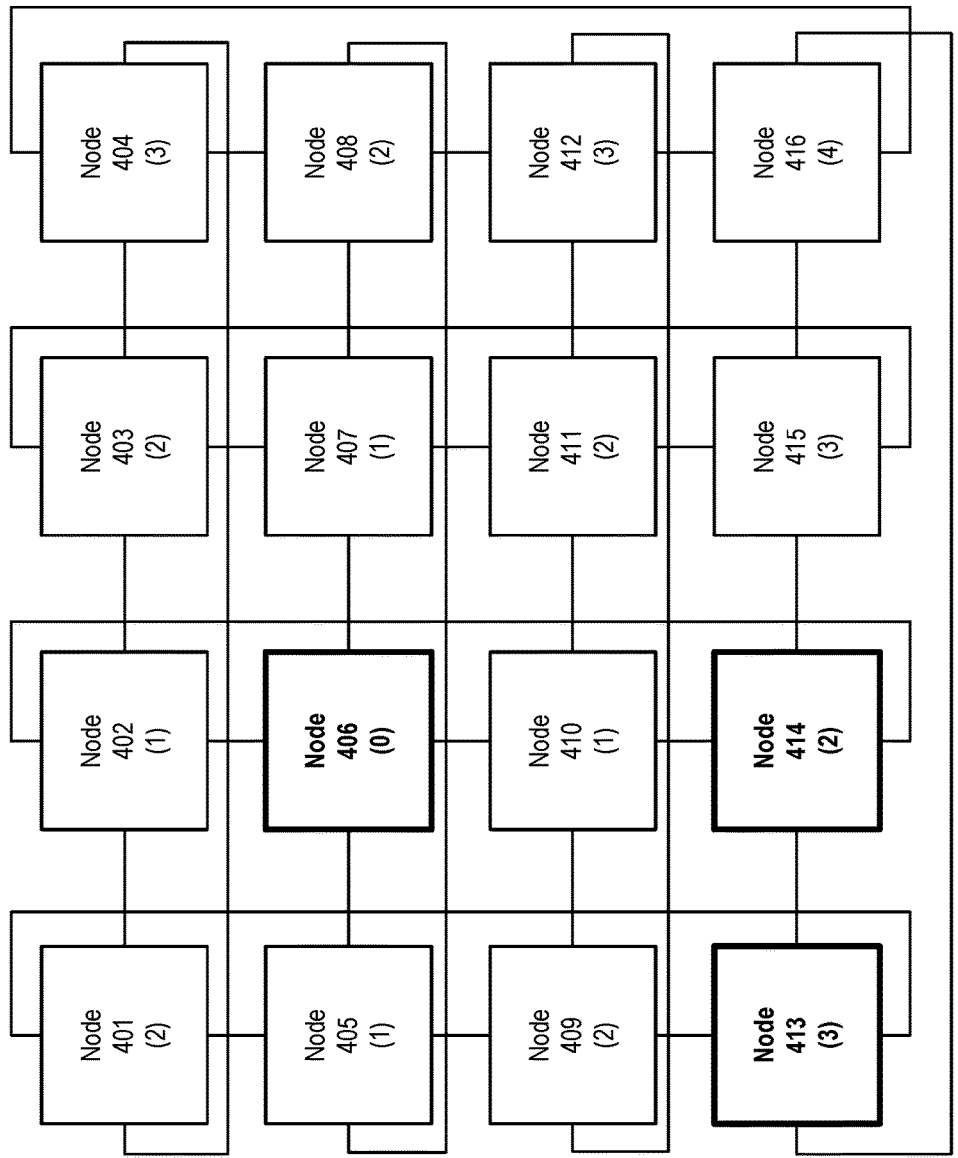
FIG. 4 is an illustration of an exemplary multi-dimensional ring-lattice topology in a network environment, in accordance with an embodiment.

FIG. 4 is an illustration of an exemplary multi-dimensional ring-lattice topology in a network environment, in accordance with an embodiment.

In accordance with an embodiment, FIG. 4 shows an example of a four-by-four, two-dimensional ring-lattice. In this example, the ring-lattice topology comprises sixteen nodes 401-416, where each node is attached to four links, with each link connecting each node to one or more neighboring nodes within the ring-lattice.

In accordance with an embodiment, starting at node 406, which is marked "0", each node in the ring-lattice topology is marked with a number of "hops" between node 406 and itself. That is, for example, node 414 is marked with a "2", indicating it is, at a minimum, two hops away from node 406, while node 413 is marked with a "3", indicating it is, at a minimum, three hops away from node 406 (the above nodes are highlighted in the drawing, for purposes of illustration).

In accordance with an embodiment, as calculated by the above formulae, the worst-case distance from any given node within the network depicted in FIG. 4 is 4, as shown below:

$$C = \left\lfloor \frac{\lceil \sqrt[dim]{N} \rceil}{2} \right\rfloor * \dim = \left\lfloor \frac{\lceil \sqrt[2]{16} \rceil}{2} \right\rfloor * 2 = \left\lfloor \frac{4}{2} \right\rfloor * 2 = 2 * 2 = 4$$

In accordance with an embodiment, the mean distance of any node from an origin node, as depicted in FIG. 4, is 2.13333333, with all destination nodes being weighted equally.

Figure 5:
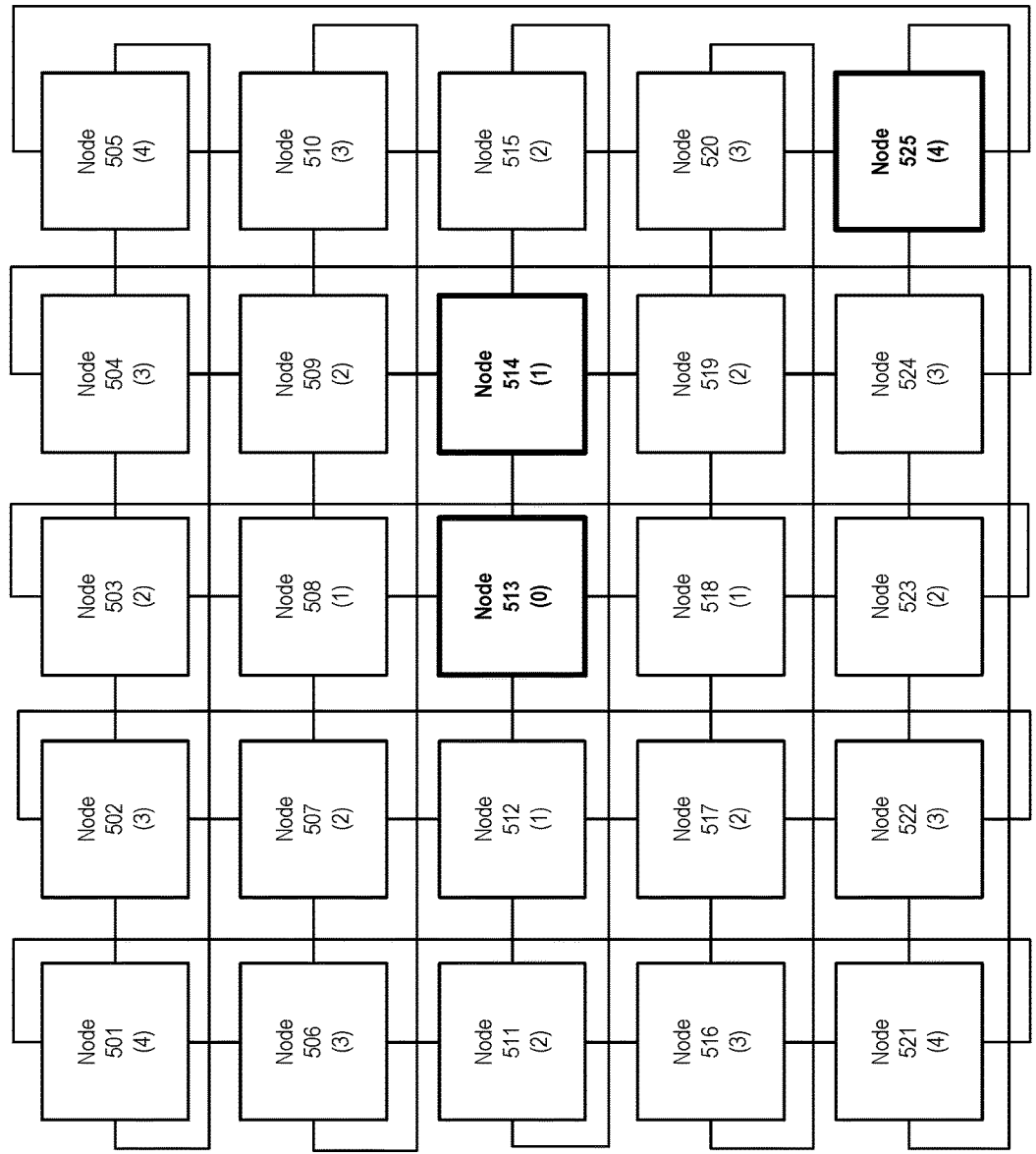
FIG. 5 is an illustration of an exemplary multi-dimensional ring-lattice topology in a network environment, in accordance with an embodiment.

FIG. 5 is an illustration of an exemplary multi-dimensional ring-lattice topology in a network environment, in accordance with an embodiment.

In accordance with an embodiment, more specifically, FIG. 5 shows an example of a five-by-five, two-dimensional ring-lattice. In this example, the ring-lattice topology comprises twenty-five nodes 501-525, where each node is attached to four links, with each link connecting each node to one neighboring node within the ring-lattice.

In accordance with an embodiment, starting at node 513, which is marked "0", each node in the ring-lattice topology is marked with a number of "hops" between node 513 and itself. That is, for example, node 514 is marked with a "1", indicating it is, at a minimum, one hop away from node 513, while node 525 is marked with a "4", indicating it is, at a minimum, four hops away from node 513 (the above nodes are highlighted in the drawing, for purposes of illustration).

In accordance with an embodiment, as calculated by the above formulae, the worst-case distance from any given node within the network depicted in FIG. 5 is 4, as shown below:

$$C = \left\lfloor \frac{\lceil \sqrt[dim]{N} \rceil}{2} \right\rfloor * \dim = \left\lfloor \frac{\lceil \sqrt[2]{25} \rceil}{2} \right\rfloor * 2 = \left\lfloor \frac{5}{2} \right\rfloor * 2 = 2 * 2 = 4$$

In accordance with an embodiment, the mean distance of any node from an origin node, as depicted in FIG. 5, is 2.5, with all destination nodes being weighted equally.

In accordance with an embodiment, in a physical, wired, network environment, usually the geography overlay of a network and other physical restrictions such as real-estate ownership and right of way dictate the network topology. A notable exception is the data center physical network, where a high density of network elements are located in close proximity to each other, such that the designer is free from topological restrictions to find a best tradeoff between cost, reliability, and performance. Another example of a physical network that can benefit from the systems and methods described herein is the interconnect fabric on a semiconductor device (e.g., system on a chip), which carries data between the many CPU cores, caches, memory controllers, etc.

In accordance with an embodiment, the systems and methods disclosed herein can be applied in the context of a physical network environment, such as a data center network. In such a network environment, compute devices can be arranged and organized in racks. Each rack houses at least one Top of Rack (ToR) switch, which is the first network element after the compute device. Typically, a data center rack is organized in such a way that there is a switch at the top of the rack (ToR), and some number (for example, up to 60) compute hosts (e.g., computers, compute nodes) "below" the Top of Rack switch, where each compute host comprises a number of its own network interfaces (e.g., one or two). Then, each network interface of the compute hosts is/are connected to a dedicated ToR port (e.g., as illustrated and described in the various drawings herein with indicia p0 through p6), usually operating at a lower speed than those of the ToR switches.

In accordance with an embodiment, the ToR switches generally have a number of faster links (e.g., between 4 to 16) that connect each respective rack as a whole to the remainder of the racks and network.

In accordance with an embodiment, a four-dimensional lattice can be conceptualized for use with such racks. In such a topology, the racks are organized as 16 rows (or columns) with 16 racks in each row. Starting with a two-dimensional lattice, each ToR switch would need 4 ports available: p0 to p3. Within the rack, each row of the lattice can be assigned a letter, such as "A" through "P". As well, each column can be assigned a number, such as "01" through "16".

In accordance with an embodiment, a two-dimensional lattice can be formed by connecting ToRs within a row to each other using port p0 in an "up" direction, and port p1 in a down direction. That is, node A01 is connected, via its port p0, to node A02, via A02's port p1. Thus, A01:p0→A02:p1; A02:p0→A03:p1; A16:p0→A01:p1.

This pattern can be repeated for every row through "P".

In accordance with an embodiment, the above described two-dimensional lattice can additionally be inter-connected in the other direction, via ports p2 and p3 of each node. That is, A01:p2→B01:p3; B01:p2→C01:p3; p01:p2→A01:p3.

This pattern can be repeated for every column through "16".

In accordance with an embodiment, according to the formula above, N=256, dim=2; and the worst-case distance between any two given nodes is C=16. This topology is not the most efficient, but it can be improved with the addition of more dimensions. In the next example, the systems and methods described herein demonstrate the improved performance of using a higher level of dimensions.

Figure 6A:
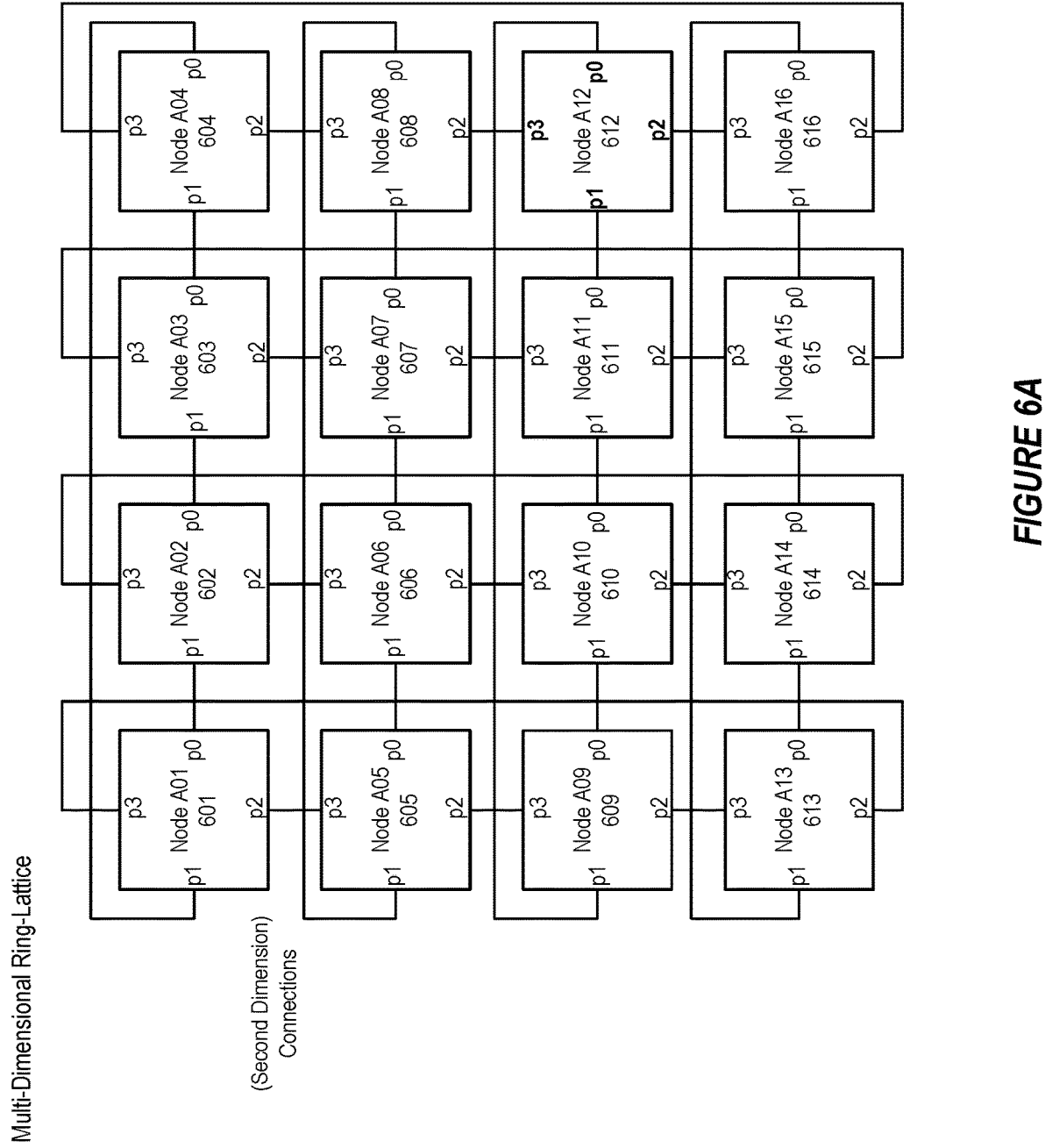
FIG. 6A is an illustration of an exemplary multi-dimensional ring-lattice topology in a network environment, in accordance with an embodiment.

FIG. 6A is an illustration of an exemplary multi-dimensional ring-lattice topology in a network environment, in accordance with an embodiment.

In accordance with an embodiment, more specifically, FIG. 6A illustrates a portion of a four-dimensional lattice, for example the same rack label designation as discussed above (assigning labels to each rack and ToR) comprising letter "A" through letter "P", and a number between 01 and 16 designating the rack within the row (or column). In addition, each ToR switch comprises 6 ports, namely ports p0 through p5.

In accordance with an embodiment, each row (or column) can be arranged into a 4×4 square lattice, as shown in the figure, with nodes AO through A15 (601-616), being arranged in a square lattice. (In actual practice, such rows would not be arranged in a square matrix, but rather a row; a matrix is used in the drawing for purposes of clarity of illustration).

In accordance with an embodiment ports p0 and p1 can be used to form connections in a lateral direction, that is: A01:p0→A02:p1; A02:p0→A03:p1; A03:p0→A04:p1; A04:p0→A01:p1.

This process is repeated for the remaining groups of four racks, namely: A05 . . . A08; A09 . . . A12; and A13 . . . A16. This process is repeated for all other rows.

Then, p2 and p3 can be used to form connections in the vertical direction, namely: A01:p2→A05:p3; A05:p2→A09: p3; A09:p2→A13:p3; A13:p2→A01:p3.

The process is then repeated for the remaining series of interconnections over 4 rack stations away.

Figure 6B:
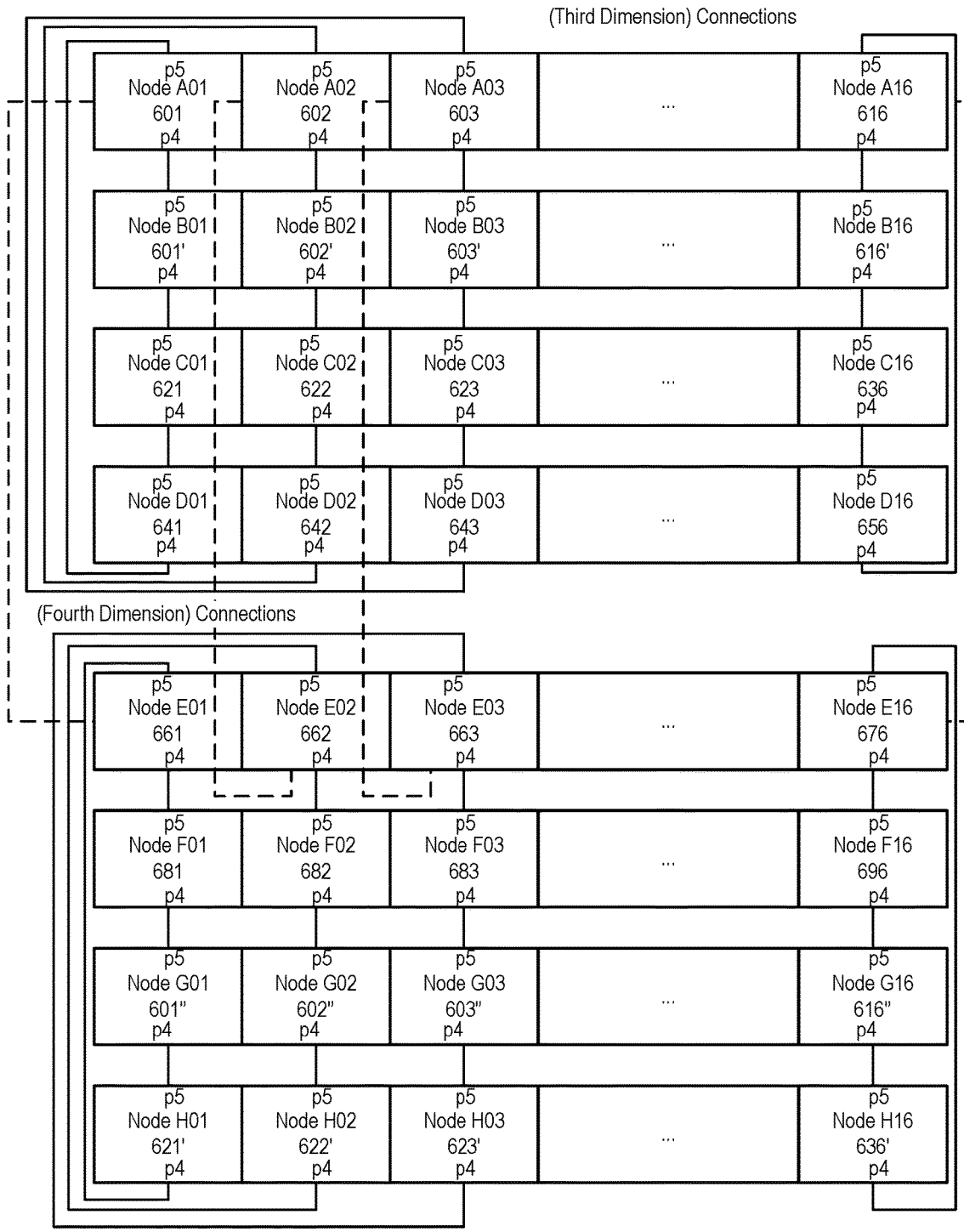
FIG. 6B is an illustration of an exemplary multi-dimensional ring-lattice topology in a network environment, in accordance with an embodiment.

FIG. 6B is an illustration of an exemplary multi-dimensional ring-lattice topology in a network environment, in accordance with an embodiment.

In accordance with an embodiment, and continuing the description from FIG. 6A, FIG. 6B illustrates multiple (in this example, eight) racks arranged in a linear manner, with each rack comprising 16 rows, namely: A01 through A16 (601-616), B01-B16 (601'-616'), C01-C16 (621-636), D01-D16 (641-656), E01-E16 (661-676), F01-F16 (681-696), G01-G16 (601''-616''), and H01-H16 (621'-636').

In accordance with an embodiment, as shown in the Figure, each rack uses ports P4, and p5 to form a third dimension, which interconnects each group of four rows, forming rings of racks with the same numeric label portion (illustrated in the figure with solid connection lines). In addition, ports p6 and p7 (not shown) can be used to form connections in a fourth dimension, that interconnects the four groups of rows. For clarity of illustration, only a partial set of fourth-dimension connections between row A and row E are shown in the drawing (illustrated with dashed connection lines).

In accordance with an embodiment, the above formulae where N=256, dim=4; and C=8, provides as shown below:

$$C = \left\lfloor \frac{\lceil \sqrt[dim]{N} \rceil}{2} \right\rfloor * \dim = \left\lfloor \frac{\lceil \sqrt[4]{256} \rceil}{2} \right\rfloor * 4 = \left\lfloor \frac{4}{2} \right\rfloor * 4 = 2 * 4 = 8$$

In accordance with an embodiment, while this relatively complex interconnection logic may appear complex when presented within the drawings, in practice it is enough to say that the first level interconnects the 4 closest racks; while the second level interconnects those separated by 4 rack spaces; the third level connects those separated by 16 rack spaces, and the fourth level links skip over 64 rack spaces.

In accordance with an embodiment, then, this means that a packet travelling between any two compute devices in such a data center will need to traverse 8 switches, at most, in order to be routed from one network interface to another.

In accordance with an embodiment, as a byproduct, each rack can be considered as a two-dimensional lattice of N=16, C=4, i.e., with just 4 switches in the transmission path.

In accordance with an embodiment, without any additional network device aside of the ToR switches, and 8 additional ports in each to form an interconnect, the approach can be used to provide one-way latency of 4 microseconds worst case.

Virtual Networking

In accordance with an embodiment, in virtual networking, the networking elements (i.e., nodes) are software entities, or data structures in memory which represent the virtual objects. Likewise, links are also represented as data structures in memory. On each physical network element, there is a number of data structures representing virtual network interface objects, and tunnel end-point objects. The virtual network interface objects are equivalent to the compute devices of the physical network world, and tunnels are equivalent to the physical links (e.g., optical cables) connecting two network switches, and use up one port on each. In other words, the tunnel endpoint is the virtual equivalent of a network switch port.

In accordance with an embodiment, while such virtual networking objects are merely memory constructs and have no physical representation, this holds true only so far. As virtual networks scale up in size, memory limitations begin to be limiting factors for such virtual networks. In addition, growing processing overhead resulting from the data structure growing size (e.g. reduce cache hit ratios, additional lookup overhead), and the electrical energy that is consumed by the added memory and processing are all limiting factors that place real world size and bandwidth limitations on such virtual networks.

In accordance with an embodiment, the current practice in virtual networks is to implement fully connected meshes at the virtual overlay, a solution that appeals at the early stages of virtual network deployment, and in use cases (such as enterprise cloud) where scaling requirements are modest. Full mesh virtual connectivity is where the number of tunnels (and hence the number of tunnel endpoints) in the entire system has quadratic relationship to the total number of virtual network interfaces (i.e., $O(N^2)$).

Given that the above-mentioned costs of virtual network elements are orders of magnitude lower than the cost of their physical-network equivalents, there are many situations where the quadratic cost ramp is acceptable, but when large scale is anticipated, such as is the case with public could services, a more cost-effective alternative would be highly desirable, and that is what is described below as an exemplary embodiment.

In accordance with an embodiment, using the above-described approach, two types of tunnels can be defined. First, a permanent tunnel is defined by a network control plane during provisioning, and remains active until it is deprovisioned. Second, a temporary on-demand tunnel is created by the virtual networking software on-demand, to facilitate a direct tunnel between two virtual network interfaces where such a direct connection is not available with a permanent tunnel, and where there is high enough or sufficient traffic demand between these two interfaces that justifies a direct tunnel.

In accordance with an embodiment, the present disclosure takes advantage of the observation that very rarely the actual communications pattern forms a full mesh, but instead the compute devices in a network form transient groups from time to time, where the majority of traffic is exchange over a small portion of all possible pairs of nodes. When a pair of nodes indicate that they need to exchange traffic, a transient or temporary tunnel can be created between these nodes to facilitate direct traffic, while potentially tearing down another such direct tunnel which has recently not been active.

In accordance with an embodiment, then, the permanent tunnels are no longer used for the majority of traffic volume and no longer need to form a full mesh. Instead, the permanent tunnels will form a partial mesh per the topology design principles disclosed herein, where all bridges act as intermediate nodes to pass traffic along to other directly connected bridges, whole also connected to a plurality of virtual network interfaces representing virtual compute devices.

In accordance with an embodiment, a control plane can provision the permanent tunnels as a multi-dimensional ring-lattice, which using just a few such permanent tunnels in each bridge, but using other bridges as intermediaries, is capable of delivering a packet to any other bridge belonging to the same virtual network.

This partially-connected network of permanent tunnels can then serve as a conduit for multicast traffic and for discovering the location of virtual network interfaces on the physical network, which is subsequently used for creating transient or temporary on-demand tunnels which carry the majority of unicast traffic directly between communicating nodes.

In accordance with an embodiment, described below is an exemplary design for the permanent tunnel network to serve this purpose.

Suppose a virtual network comprises N=4,096 network interfaces. Bridges that participate in a given virtual network represent at least one virtual network interface, so there can be up to 4,096 interconnected bridges.

In accordance with an embodiment, the permanent tunnel network can comprise 4 dimensions, which then implies that every bridge choosing the dimension level to be 4, which implies that every bridge will provision 8 permanent tunnels, and in addition, each bridge will comprise 8 tunnel end points.

In accordance with an embodiment, using the formula above, it can be calculated that a four-dimensional ring-lattice of 4,096 nodes will be able to deliver a packet between any two nodes by traversing up to a maximum of 16 links.

$$C = \left\lfloor \frac{\lceil \sqrt[dim]{N} \rceil}{2} \right\rfloor * \dim = \left\lfloor \frac{\lceil \sqrt[4]{4096} \rceil}{2} \right\rfloor * 4 = \left\lfloor \frac{8}{2} \right\rfloor * 4 = 4 * 4 = 16$$

In accordance with an embodiment, the permanent partial mesh also creates a high level of redundancy, where each packet is replicated to every tunnel end point except the one it was received from, and it is expected that multiple replicas of the same original packet will be received by many bridges.

This redundancy offers both a valuable advantage and a challenge: The redundancy adds resiliency to the network, in that it can sustain a failure of many physical elements (nodes and links) without interrupting communications with the remaining elements. The challenge is that this packet replication mechanism may create forwarding loops, unless mitigated.

In accordance with an embodiment, a method of mitigation can include implementing a routing protocol on top of the permanent tunnel network that dynamically calculates the best route to any node within the virtual network domain and will quickly react to failures and recoveries of physical elements. Another type of solution to address the redundancy and potential forwarding loops is disclosed in U.S. patent application titled "SYSTEM AND METHOD FOR PREVENTING SWITCH LOOPS IN LAYER-2 NETWORKS", Ser. No. 16/868,368, filed on May 6, 2020, which is herein incorporated by reference in its entirety.

Figure 7:
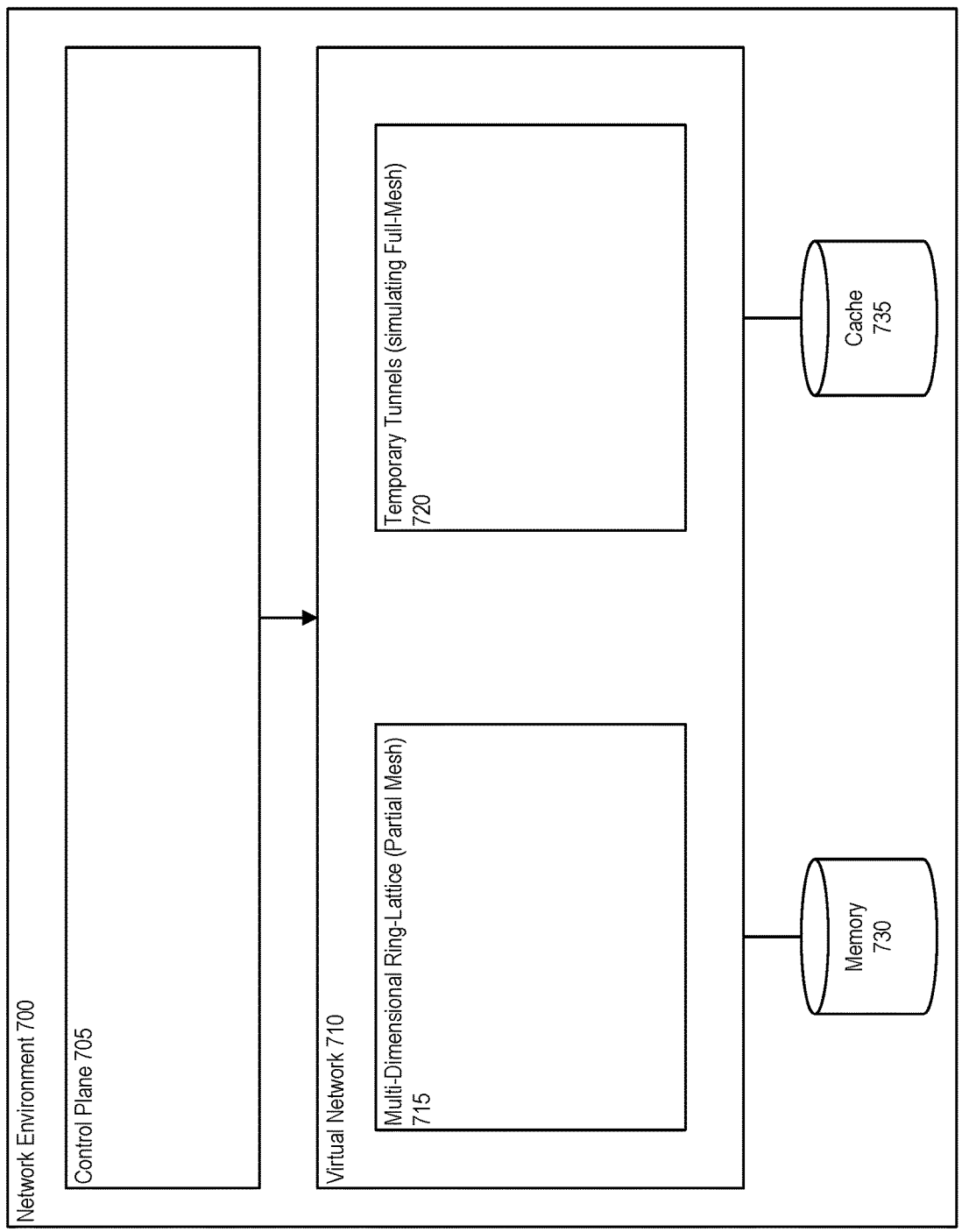
FIG. 7 is an illustration of a system for providing a multi-dimensional ring-lattice network topology, in accordance with an embodiment.

FIG. 7 is an illustration of a system for providing a multi-dimensional ring-lattice network topology, in accordance with an embodiment.

In accordance with an embodiment, a network environment 700 can be provided on associated hardware (e.g., one or more computers, each comprising memory and one or more microprocessors). Within the network environment, a control plane 705 can be provided that has associated privileges and control abilities within a virtual network 710.

In accordance with an embodiment, a virtual network 710 can be provided within, e.g., a memory 730, and can run via the hardware associated with the network environment 700.

In accordance with an embodiment, within the virtual network 710, a partial mesh, multi-dimensional ring-lattice 715 can be provisioned by the control plane 705. This multi-dimensional ring-lattice can comprise the permanent tunnels as described above. Such a multi-dimensional ring-lattice, which uses just a few such permanent tunnels in each bridge, but using other bridges as intermediaries is capable of delivering a packet to any other bridge belonging to the same virtual network. This partially-connected network of permanent tunnels can then serve as a conduit for multicast traffic and for discovering the location of virtual network interfaces on the physical network. Such discovery can be subsequently used for creating transient or temporary on-demand tunnels 720 which carry the majority of unicast traffic directly between communicating nodes.

In accordance with an embodiment, the temporary "full mesh" tunnels 720 can be stored in a cache 735. Such tunnels can, e.g., represent currently used, or used frequently, tunnels between virtual network interfaces (e.g., virtualized Network Interface Cards, VNICs), such that traffic between these VNICs can proceed via unicast traffic.

In accordance with an embodiment, the cache 735 can be of a finite size, meaning that it can only hold a set number of such "full mesh" tunnels for handing unicast traffic. As new entries are added to the cache 735, old entries, or those entries which are not currently being used (or heavily used) can be removed from the cache 735 in order to make room for newly-defined temporary tunnels that the virtual network currently prioritizes.

Figure 8:
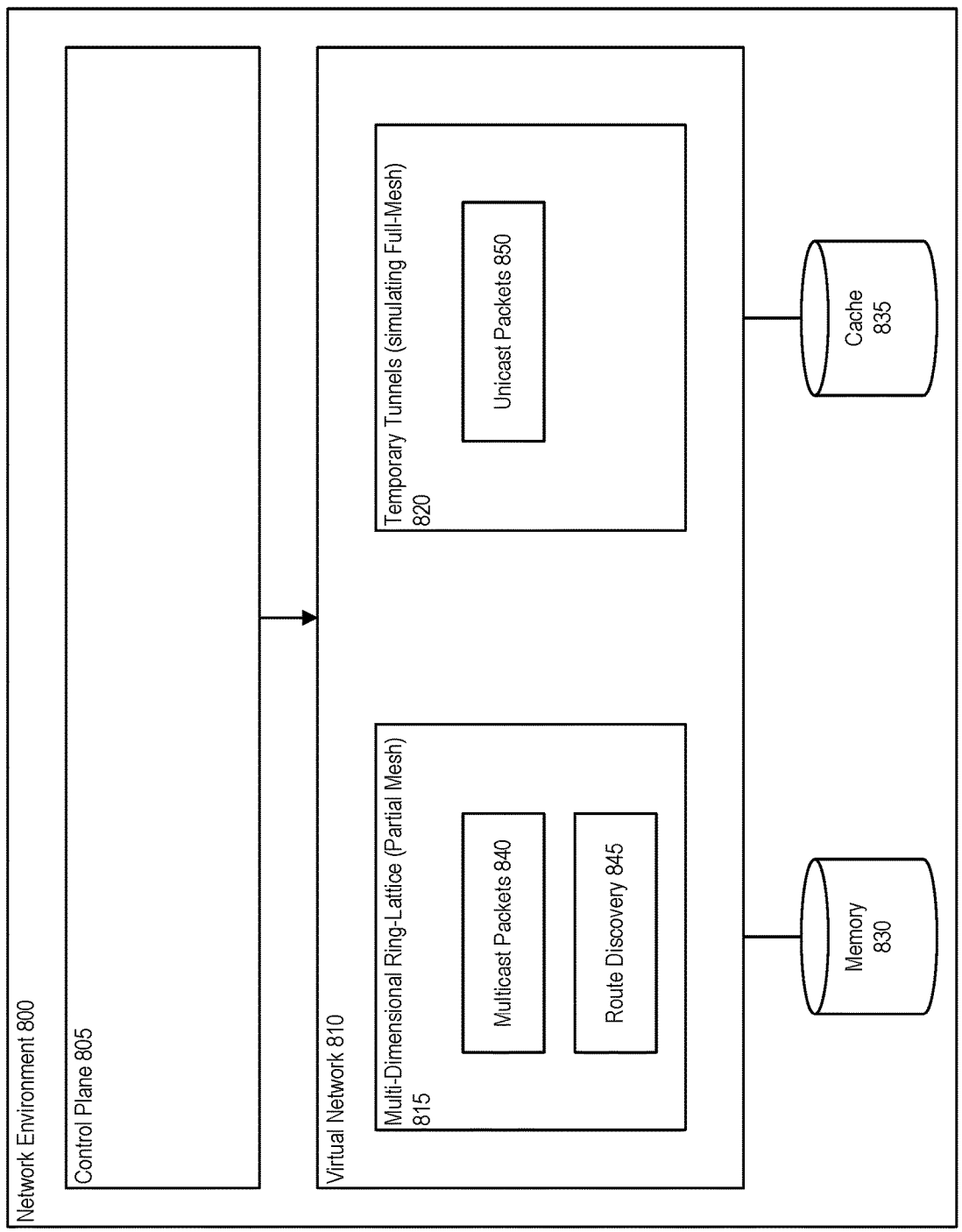
FIG. 8 is an illustration of a system for providing a multi-dimensional ring-lattice network topology, in accordance with an embodiment.

FIG. 8 is an illustration of a system for providing a multi-dimensional ring-lattice network topology, in accordance with an embodiment.

In accordance with an embodiment, a network environment 800 can be provided on associated hardware (e.g., one or more computers, each comprising memory and one or more microprocessors). Within the network environment, a control plane 805 can be provided that has associated privileges and control abilities within a virtual network 810.

In accordance with an embodiment, a virtual network 810 can be provided within, e.g., a memory 830, and can run via the hardware associated with the network environment 800.

In accordance with an embodiment, within the virtual network 810, a partial mesh, multi-dimensional ring-lattice 815 can be provisioned by the control plane 805. This multi-dimensional ring-lattice can comprise the permanent tunnels as described above. Such a multi-dimensional ring-lattice, which uses just a few such permanent tunnels in each bridge, but using other bridges as intermediaries, is capable of delivering a packet to any other bridge belonging to the same virtual network. This partially-connected network of permanent tunnels can then serve as a conduit for multicast traffic 840 and for route discovery 845. The route discovery can be used to find the location of virtual network interfaces on the physical network. Such discovery can be subsequently used for creating transient or temporary on-demand tunnels 820 which carry the majority of unicast 850 traffic directly between communicating nodes.

In accordance with an embodiment, the temporary "full mesh" tunnels 820 can be stored in a cache 835. Such tunnels can, e.g., represent currently used, or used frequently, tunnels between virtual network interfaces (VNICs) such that traffic between these VNICs can proceed via unicast traffic 850.

In accordance with an embodiment, the cache 835 can be of a finite size, meaning that it can only hold a set number of such "full mesh" tunnels for handing unicast traffic. As new entries are added to the cache 835, old entries, or those entries which are not currently being used (or heavily used)

can be removed from the cache 835 in order to make room newly defined temporary tunnels that the virtual network currently prioritizes.

Figure 9:
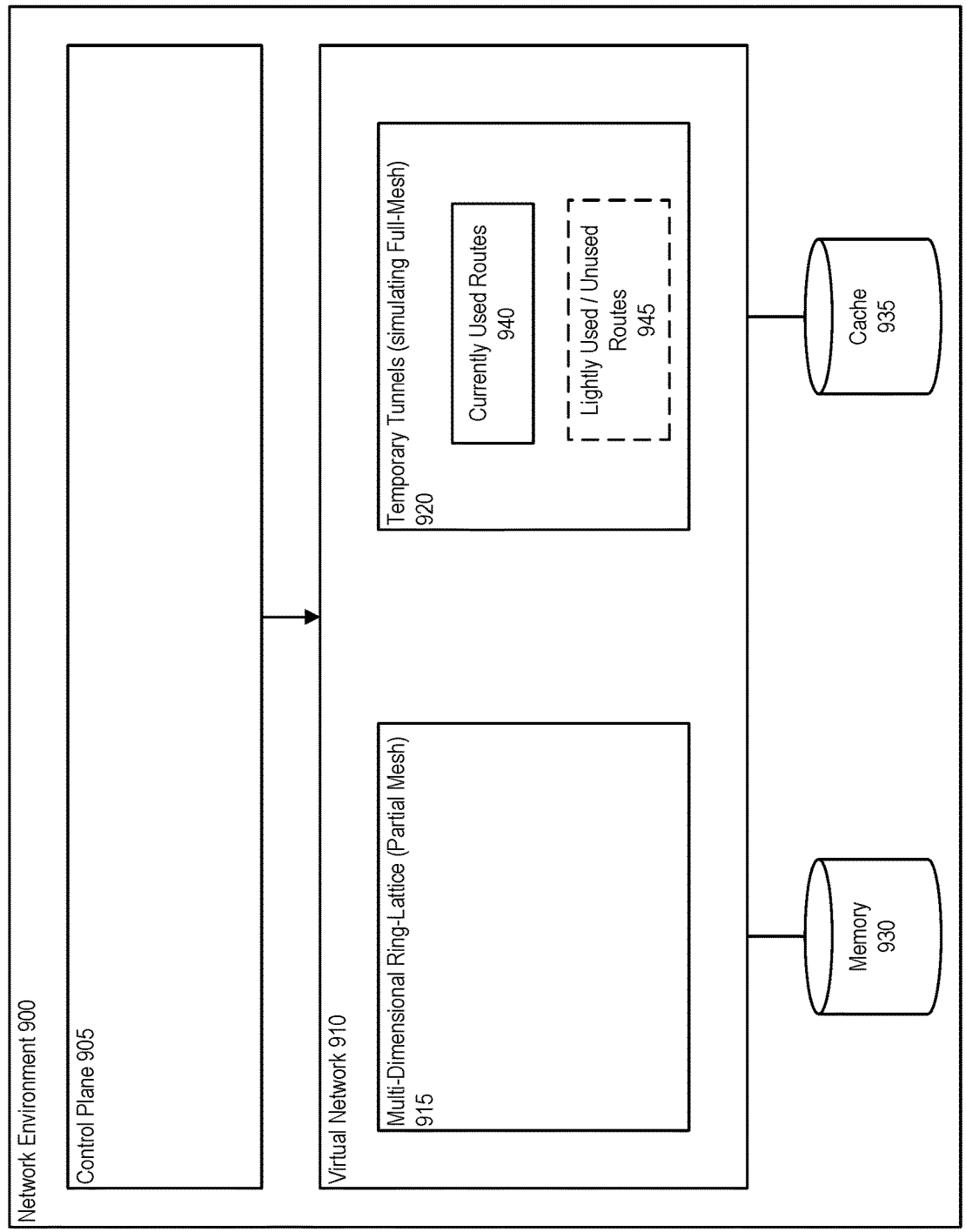
FIG. 9 is an illustration of a system for providing a multi-dimensional ring-lattice network topology, in accordance with an embodiment.

FIG. 9 is an illustration of a system for providing a multi-dimensional ring-lattice network topology, in accordance with an embodiment.

In accordance with an embodiment, a network environment 900 can be provided on associated hardware (e.g., one or more computers, each comprising memory and one or more microprocessors). Within the network environment, a control plane 905 can be provided that has associated privileges and control abilities within a virtual network 910.

In accordance with an embodiment, a virtual network 910 can be provided within, e.g., a memory 930, and can run via the hardware associated with the network environment 900.

In accordance with an embodiment, within the virtual network 910, a partial mesh, multi-dimensional ring-lattice 915 can be provisioned by the control plane 905. This multi-dimensional ring-lattice can comprise the permanent tunnels as described above. Such a multi-dimensional ring-lattice, which uses just a few such permanent tunnels in each bridge, but using other bridges as intermediaries is capable of delivering a packet to any other bridge belonging to the same virtual network. This partially-connected network of permanent tunnels can then serve as a conduit for multicast traffic and for route discovery. The route discovery can be used to find the location of virtual network interfaces on the physical network. Such discovery can be subsequently used for creating transient or temporary on-demand tunnels 920 which carry the majority of unicast 950 traffic directly between communicating nodes.

In accordance with an embodiment, the temporary "full mesh" tunnels 920 can be stored in a cache 935. Such tunnels can, e.g., represent currently used routes 940, or used frequently, tunnels between virtual network interfaces (VNICs) such that traffic between these VNICs can proceed via unicast traffic 950.

In accordance with an embodiment, the cache 935 can be of a finite size, meaning that it can only hold a set number of such "full mesh" tunnels for handing unicast traffic. As new entries are added to the cache 935 (e.g., currently used routes 940) old entries, such as lightly used or previously defined routes which are not currently being used 945, can be removed from the cache 935 in order to make room newly defined temporary tunnels that the virtual network currently prioritizes.

Figure 10:
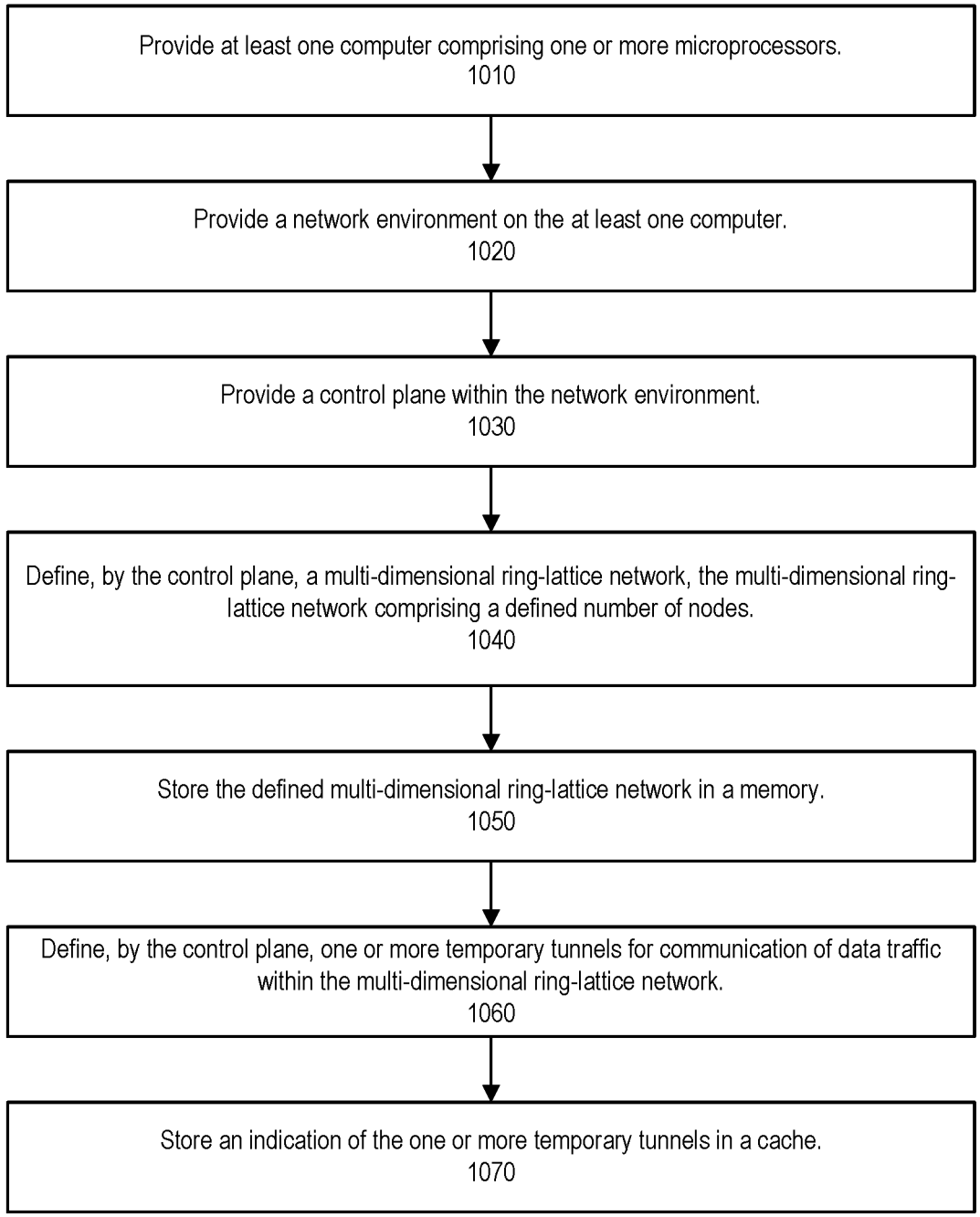
FIG. 10 is a flowchart of a method for providing a multi-dimensional ring-lattice network topology, in accordance with an embodiment.

FIG. 10 is a flowchart of a method for providing a multi-dimensional ring-lattice network topology, in accordance with an embodiment.

In accordance with an embodiment, at step 1010, the method can provide at least one computer comprising one or more microprocessors.

In accordance with an embodiment, at step 1020, the method can provide a network environment on the at least one computer.

In accordance with an embodiment, at step 1030, the method can provide a control plane within the network environment.

In accordance with an embodiment, at step 1040, the method can define, by the control plane, a multi-dimensional ring-lattice network, the multi-dimensional ring-lattice network comprising a defined number of nodes.

In accordance with an embodiment, at step 1050, the method can store the defined multi-dimensional ring-lattice network in a memory.

In accordance with an embodiment, at step 1060, the method can define, by the control plane, one or more temporary tunnels for communication of data traffic within the multi-dimensional ring-lattice network.

In accordance with an embodiment, at step 1070, the method can store an indication of the one or more temporary tunnels in a cache.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/ or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/ interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, minicomputers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g., on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application program code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A method for providing a multi-dimensional ring-lattice network topology, comprising:
providing at least one computer comprising one or more microprocessors;
providing a network environment on the at least one computer;
providing a control plane within the network environment;
defining, by the control plane, a multi-dimensional ring-lattice network, the multi-dimensional ring-lattice network comprising a defined number of nodes;
providing a plurality of virtual network interfaces, wherein the plurality of virtual network interfaces is interconnected by the defined multi-dimensional ring-lattice network;
storing the defined multi-dimensional ring-lattice network in a memory;
defining, by the control plane, one or more temporary tunnels for communication of data traffic within the multi-dimensional ring-lattice network, wherein each of the one or more temporary tunnels carries traffic between the defined number of nodes; and
storing an indication of the one or more temporary tunnels in a cache;
wherein the multi-dimensional ring-lattice network comprises a finite number of nodes and a finite dimension;
wherein a maximum distance between any two of the plurality of virtual network interfaces is directly related to the finite number of nodes and the finite dimension of the multi-dimensional ring-lattice network;
wherein the multi-dimensional ring-lattice network provides for multicast traffic between the plurality of virtual network interfaces;
wherein the control plane utilizes the multi-dimensional ring-lattice network to define the one or more temporary tunnels based upon high traffic among a set of the plurality of network interfaces, which temporary tunnels are then stored in the cache.

2. The method of claim 1,
wherein the cache comprises a memory of a finite size.

3. The method of claim 2,
wherein upon a new temporary tunnel being added to the cache, an existing temporary tunnel within the cache is removed.

4. The method of claim 1,
wherein a temporary tunnel of the defined one or more temporary tunnels is used for unicast traffic between a pair of the plurality of virtual network interfaces.

5. A system for providing a multi-dimensional ring-lattice network topology, comprising:
at least one computer comprising one or more microprocessors;
a network environment on the at least one computer;
a control plane within the network environment, wherein the control plane defines a multi-dimensional ring-lattice network, the multi-dimensional ring-lattice network comprising a defined number of nodes; and
a plurality of virtual network interfaces, wherein the plurality of virtual network interfaces is interconnected by the defined multi-dimensional ring-lattice network;
wherein the defined multi-dimensional ring-lattice network is stored in a memory;
wherein the control plane defines one or more temporary tunnels for communication of data traffic within the multi-dimensional ring-lattice network, wherein each of the one or more temporary tunnels carries traffic between the defined number of nodes;
wherein an indication of the one or more temporary tunnels is stored in a cache;
wherein the multi-dimensional ring-lattice network comprises a finite number of nodes and a finite dimension;
wherein a maximum distance between any two of the plurality of virtual network interfaces is directly related to the finite number of nodes and the finite dimension of the multi-dimensional ring-lattice network;
wherein the multi-dimensional ring-lattice network provides for multicast traffic between the plurality of virtual network interfaces;
wherein the control plane utilizes the multi-dimensional ring-lattice network to define the one or more temporary tunnels based upon high traffic among a set of the plurality of network interfaces, which temporary tunnels are then stored in the cache.

6. The system of claim 5,
wherein the cache comprises a memory of a finite size.

7. The system of claim 6,
wherein upon a new temporary tunnel being added to the cache, an existing temporary tunnel within the cache is removed.

8. The system of claim 5,
wherein a temporary tunnel of the defined one or more temporary tunnels is used for unicast traffic between a pair of the plurality of virtual network interfaces.

9. A non-transitory computer readable storage medium having instructions thereon for providing a multi-dimensional ring-lattice network topology, which when read an executed cause a computer to perform steps comprising:
providing at least one computer comprising one or more microprocessors;
providing a network environment on the at least one computer;
providing a control plane within the network environment;
defining, by the control plane, a multi-dimensional ring-lattice network, the multi-dimensional ring-lattice network comprising a defined number of nodes;
providing a plurality of virtual network interfaces, wherein the plurality of virtual network interfaces is interconnected by the defined multi-dimensional ring-lattice network;
storing the defined multi-dimensional ring-lattice network in a memory;
defining, by the control plane, one or more temporary tunnels for communication of data traffic within the multi-dimensional ring-lattice network, wherein each of the one or more temporary tunnels carries traffic between the defined number of nodes; and
storing an indication of the one or more temporary tunnels in a cache;
wherein the multi-dimensional ring-lattice network comprises a finite number of nodes and a finite dimension;
wherein a maximum distance between any two of the plurality of virtual network interfaces is directly related to the finite number of nodes and the finite dimension of the multi-dimensional ring-lattice network;
wherein the multi-dimensional ring-lattice network provides for multicast traffic between the plurality of virtual network interfaces;
wherein the control plane utilizes the multi-dimensional ring-lattice network to define the one or more temporary tunnels based upon high traffic among a set of the plurality of network interfaces, which temporary tunnels are then stored in the cache.

10. The non-transitory computer readable storage medium of claim 9,
wherein the cache comprises a memory of a finite size.

11. The non-transitory computer readable storage medium of claim 10,
wherein upon a new temporary tunnel being added to the cache, an existing temporary tunnel within the cache is removed.

12. The non-transitory computer readable storage medium of claim 9,
wherein a temporary tunnel of the defined one or more temporary tunnels is used for unicast traffic between a pair of the plurality of virtual network interfaces.

* * * * *